Sept. 27, 1949.  E. J. RUHNKE ET AL  2,482,940
FILTER FOR BEVERAGE BREWING APPARATUS
Filed Dec. 7, 1946

INVENTOR.
Edward J. Ruhnke
BY Henry S. Perlman
Sheridan, Davis & Cargill
Attys

Patented Sept. 27, 1949

2,482,940

UNITED STATES PATENT OFFICE 2,482,940

FILTER FOR BEVERAGE BREWING APPARATUS

Edward J. Ruhnke and Henry S. Perlman, Chicago, Ill., assignors, by mesne assignments, to Hill-Shaw Company, Chicago, Ill., a corporation of Delaware Application December 7, 1946, Serial No. 714,746

5 Claims. (Cl. 210—162)

This invention relates to improvements in filters for beverage brewing apparatus.

In conventional coffee brewing apparatus of the vacuum type, to which the present improvements relate, the upper and lower bowls generally are retained in sealed relation during the brewing operation by a flexible gasket, such as of rubber. The gaskets usually are secured to the upper bowls but have merely frictional fit within the necks of the lower bowls and hence may be unseated by excessive pressure in the lower bowls. Filters are employed in the upper bowls for preventing the passage of coffee grounds from the upper bowls into the lower bowls during the decanting stage of a brewing operation. If a filter becomes clogged by coffee grounds in such a manner as to unduly retard the upper flow of water from the lower bowl to an upper bowl during the first stage of a brewing operation, pressure may develop in the lower bowl which, acting against the upper bowl, will unseat the gasket. Such unseating sometimes is sudden and may be caused by sufficient force to displace the upper bowl from the lower bowl and break it or it may merely result in the loss of pressure in the lower bowl which necessitates the reseating of the gasket before the brewing operation can be resumed.

The gripping or seating action of a particular gasket with respect to a particular lower bowl generally is constant, and the space or spaces provided by a particular filter in an upper bowl likewise are constant and determine the flow capacity of the filter, that is, the rate at which water from the lower bowl under a given pressure can rise through the funnel to the upper bowl. If the frictional grip of a particular gasket with respect to the lower bowl is of a relatively low order, and the flow capacity of a particular filter likewise is of a low order, the generation of pressure in the lower bowl at a rapid or excessive rate may cause such gasket to unseat with accompanying annoyance and, as mentioned above, sometimes with damage to the upper bowl. In domestic coffee brewers of the vacuum type, the pressure that normally is generated in the lower bowl and which forces water up the funnel into the upper bowl generally is about six ounces per square inch in a six to eight cup capacity brewer. Gaskets are used which will normally resist unseating at such pressures, and hence unless the filter of such apparatus fails to function the water will rise to the upper bowl without disturbing the seal afforded by the gasket. Where filters made of glass, Bakelite, porcelain, or the like, are employed, the filter bodies usually are provided with rough or pebbled surfaces, or are provided with external spacing ribs which prevent sealing contact of the filter bodies with the portion of the upper bowl adjacent the upper end of the funnel. Such roughened surfaces or the spacing ribs provide a filtering space or spaces between the filter body and the adjacent portion of the upper bowl through which water from the lower bowl may rise into the upper bowl but which space or spaces restrain the coffee grounds (except the finer particles thereof), from passing into the lower bowl during the decanting stage of the brewing operation. Where such filters are secured in position by springs or even by gravity, the gaskets not infrequently are unseated by pressure in the lower bowl where the filter spaces become clogged by fine coffee grounds, or where the source of heat is such as to generate pressure in the lower bowl at an excessive rate.

One object of the present invention is to provide a filter which, while it has means for positively seating the filter in normal filtering position can move relatively to said means in response to excessive pressure in the lower bowl for increasing the flow capacity about the filter for thereby avoiding upward displacement of the upper bowl and accompanying unseating of the gasket.

An additional object of the invention is to provide a filter having means for positively seating the same in proper position, and means which permit bodily movement of the filter away from its seat in response to excessive pressure in the lower bowl, and which means restores the filter promptly to normal position when such pressure in the lower bowl drops to normal.

Additional objects of the invention relate to various features of construction and arrangements or parts which will be apparent from a consideration of the following specification and accompanying drawings, wherein, Figure 1 is an enlarged vertical sectional view of a filter for vacuum type coffee brewing apparatus which is illustrative of the present improvements, the section being taken approximately on line 1—1 of Figure 2.

Figure 4:
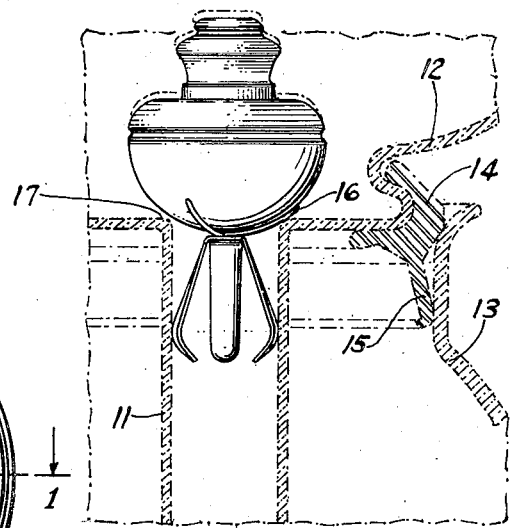
Fig. 4 is a broken vertical sectional view of conventional vacuum type brewing apparatus showing an improved filter in position therein.

Referring to the drawing 10 indicates generally the body of a filter embodying the present improvements. The body preferably is of porcelain, glazed on the outer and inner surfaces although it can be formed of glass or other suitable materials. The lower portion of the body 10 is shaped suitably for seating over the upper end of the funnel 11 of an upper bowl 12 of vacuum type brewing apparatus. In Fig. 4 a lower bowl 13 is shown in the neck of which the upper bowl 12 is sealed by means of a gasket 14. The particular gasket shown is arranged to be retained in position on the lower exterior portion of the upper bowl 12 and is provided with a downwardly and outwardly flaring flexible flange 15 which seats against the inner wall of the neck of the lower bowl to provide a seal between the bowls during the brewing operation.

Figure 2:
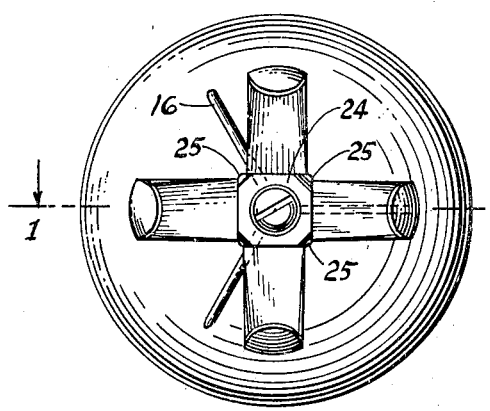
Fig. 2 is a bottom plan view of the filter shown in Fig. 1.

The lower portion of the body 10, in the particular structure illustrated, is provided with means for spacing the body proper from actual contact with the upper bowl 12 to provide a filtering space or spaces. The means illustrated comprise ribs 16, three of which are shown in Fig. 2, and which extend radially from the vertical axis of the body. When the filter is in the position shown in Fig. 4, the ribs 16 contact the margin of the upper end of the funnel and thus space the body proper slightly from the lower portion of the bowl 12 to provide a filtering space or spaces designated by numeral 17. The flow capacity of the filter space is determined by the vertical depth of the ribs 16.

Figure 1:
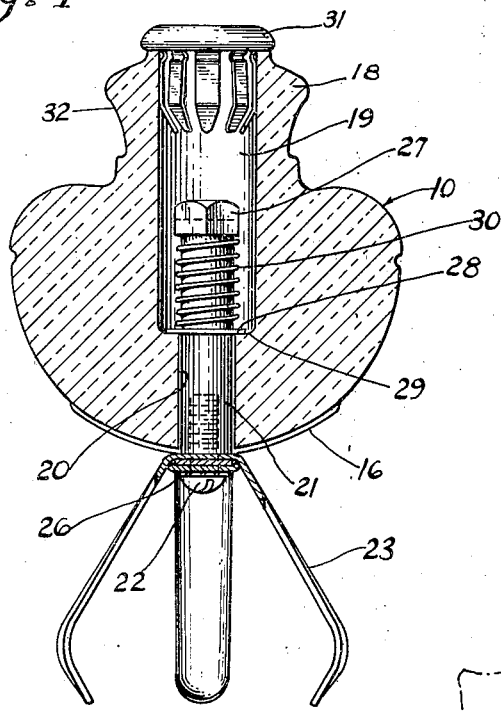
Figure 3:
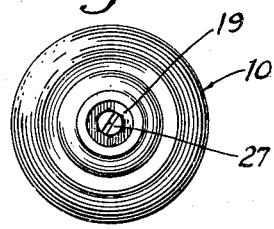
Fig. 3 is a top plan view of a filter shown in Fig. 1, but with an upper cap removed.

The upper portion of the body of the filter shown in the drawings is provided with a handle or grip portion 18, by means which the filter may be manually manipulated. The filter body is provided with an axial passage 19 which at its upper end extends to the upper end of the body and at its lower portion is of reduced diameter as indicated at 20. A relatively reciprocable guide member 21 is positioned in the passage and is internally threaded at its lower end for receiving a screw 22 for retaining a suitable filter anchoring device to the reciprocable member. The anchoring device referred to comprises a plurality of spring arms which are adapted to be pressed into the funnel 11 of the upper bowl for removably retaining the filter in position as shown in Fig. 4. The particular spring arms shown in the drawings are formed in two pairs, the arms being designated by the numeral 23. The two pairs of arms are arranged one at right angles to the other and are provided with registering passages through which the screw 22 passes. Above the head of the screw 22 a rectangular retainer 24 is provided having upwardly deflected corners 25 disposed between adjacent arms 23 which retain the pair of arms in the right angle relation mentioned. A lock washer 26 is disposed between the retainer 24 and the head of the screw 22 for retaining the assembled anchoring arms together on the lower end of the reciprocal guide member 21. The diameter of the passage 20 preferably is only slightly greater than the diameter of the guide member 21 but is sufficiently greater to permit the body 10 to reciprocate without binding upon the guide. The upper end of the member 21, as shown in Fig. 1, projects into the enlarged portion 19 of the passage and is shown as being provided with a head or enlargement 27 at its upper end. Disposed between the head and a washer 28 which rests on the shoulder 29 is a helical spring 30. The spring 30 is under compression and thus retains the reciprocal member 21 normally in the position shown in Fig. 1. It will be seen, however, that if the spring arms 23 are retained against upward movement, as when they are in frictional contact within the funnel 11, as shown in Fig. 4, the filter proper may move upwardly against the action of the spring 30 by the exertion of adequate force on the filter in an upward direction.

The upper end of the passage 19 is closed by any suitable means such as a cap 31 provided with a plurality of spring fingers 32. When the cap is pressed downwardly into the upper portion 19 of the passage, the fingers frictionally contact the upper wall of the chamber and thus retain the cap removably in the position shown in Fig. 1.

When the filter has been inserted in the brewing position illustrated in Fig. 4, and adequate heat has been applied to the lower bowl 13, the pressure that is generated in the lower bowl causes the water to rise upwardly in the funnel through the filtering passage or passages 17 into the upper bowl in which the ground coffee is placed. If the rate of generation of pressure in the lower bowl is excessive, the filter body will rise against the action of the spring 30 to increase the flow capacity of the passage or passages 17 and thereby permit water to flow upwardly into the upper bowl more freely.

In coffee brewers where a pressure of six ounces in the lower bowl usually is adequate for elevating the water to the upper bowl during a normal brewing operation, the pressure exerted by the spring 30 in a downward direction preferably is such that upon increase in the pressure of the lower bowl above the normal to eight or nine ounces the filter body will rise as above mentioned to increase the flow capacity of the space 17. Should the filter passage become clogged, and excessive pressure develop as a result thereof in the lower bowl, the filter likewise can rise in response to the resulting increased pressure to enable the water to flow more freely about the filter into the upper bowl and thereby avoid the application of pressure of such value to the upper bowl as to displace the gasket and interrupt the brewing operation.

The water from the lower bowl, in rising through the funnel into the upper bowl, flushes the coffee grounds away from the filter passage and when the pressure in the lower bowl drops to normal, the spring 30 immediately returns the filter body to normal position and, as the pressure in the lower bowl falls below atmospheric, the downward flow of the brew begins. The filter restrains downward passage of the coffee grounds, which tend to settle about the filter, and the settled grounds themselves constitute a filter bed for the fine particles of ground coffee that are momentarily suspended in the brew in the upper bowl. Hence the improved filter, while it moves upwardly in response to pressure above a predetermined value to afford a freer or less impeded flow of water upwardly into the upper bowl is returned to proper filtering position positively by spring action prior to the flow of the brew through the filtering space. The improved filter, therefore, not only avoids the interruption of the brewing operation resulting from the application of heat at an excessive or too rapid rate, but it insures a satisfactory filtering of the beverage.

The filter can be positioned readily in the normal filtering position or removed therefrom manually. The spring fingers 23 when pressed into the funnel with the ribs 16 in contact with the base of the upper bowl aligns the axis of the guide stem 21 with the axis of the funnel and since the lower portion 20 of the passage is only sufficiently greater in diameter than the guide to insure relative free movement of the body, the latter is guided properly to filtering position by the stem following upward displacement of the body as above described.

The cap 31 excludes coffee grounds from the passage 19, 20 but the cap may be removed if desirable and the screw 22 removed to disassemble the parts for cleansing or renewal when required.

While a structure illustrative of the invention

We claim:

1. A filter for use with a beverage brewer of the vacuum type provided with an upper bowl having a depending funnel, said filter comprising an axially recessed filter body provided with means on the exterior of the lower portion adapted to space the body from the bottom of the bowl to provide a filtering space adjacent the upper end of the funnel, means for frictionally contracting the inner wall of the funnel for anchoring the filter releasably in position, a guide stem secured to said anchoring means and extending into the recess of the body, and resilient means located within said recess and coacting with said stem and body independently of said anchoring means to enable the filter body to move relatively to the stem in response to pressure of fixed value exerted upwardly against the body for enlarging the space between the body and the bottom of the bowl.

2. A filter for use with a beverage brewer of the vacuum type provided with an upper bowl having a depending funnel upwardly through which water passes into the upper bowl and downwardly through which brewed beverage passes during a brewing operation, said filter comprising an axially recessed body provided with means on the exterior of the lower portion adapted to seat on the bottom of the bowl adjacent the upper end of the funnel to provide a filtering space between the body and the adjacent portion of the bowl, a stem in said recess adapted to project from the lower end of the recess, a plurality of spring fingers secured to the lower end of the stem and arranged to be pressed into the upper end of the funnel for releasably anchoring the filter in filtering position in said bowl, and a compression spring in said recess acting on said body and stem in opposite directions normally for retaining said body in filtering position when said anchoring means are positioned in said funnel and being yieldable under given pressure exerted on the lower portion of said body to enable the latter to move relatively to said stem out of normal filtering position for enlarging said space to reduce resistence to the upward passage of water through the funnel into said bowl.

3. A filter for use over the upper end of a funnel of an upper bowl of vacuum type beverage brewing apparatus comprising a filter body provided with means on the lower portion of the exterior surface to provide a filtering space therebetween, said body having an axial passage provided with a shoulder, a stem slidably positioned within said passage and extending to the lower end of the passage, anchoring means secured to the lower end of said stem adapted to be pressed by contact with the body into the upper portion of the funnel of the upper bowl when the filter is placed in filtering position in the bowl for retaining the filter normally in axial alignment with the funnel, and resilient means under compression within said passage and engaging said stem and shoulder for pressing the filter downwardly relative to the stem into filtering position and being yieldable to permit the body to rise relative to the stem by pressure above a predetermined value exerted upwardly on the body to thereby increase the flow capacity of the space between the body and adjacent portions of the bowl.

4. A filter for use over the upper end of a funnel of an upper bowl of vacuum type beverage brewing apparatus comprising a filter body of bulbous form provided with formations on the lower external surface for spacing the body from the adjacent portion of the bowl when the body is in filtering position to provide a filtering space between the body and adjacent portion of the bowl, said body having an axial passage therein open at the lower end of the body, a stem in said passage relatively slidable therein in axial directions, means atttached to the lower end of the stem adapted to be pressed into the upper end of the funnel by contact with the body as the latter is placed in filtering position in the bowl for gripping the interior wall of the funnel frictionally for releasably retaining this filter in operative position within the bowl, and a helical spring under compression within and wholly enclosed by said passage and acting upwardly on said stem and downwardly on said body for retaining the body normally in filtering position and being yieldable to enable the body to move upwardly along the stem by pressure exerted on the lower portion of the body of a value above a predetermined value to thereby increase the space between the body and adjacent portion of the bowl.

5. A filter for use over the upper end of a funnel in an upper bowl of vacuum type brewing apparatus, comprising a filter body provided with formations in the lower portion thereof for spacing the body from the subjacent portion of the bowl to provide a filter space through which water passes upwardly into the bowl and by means of which brew in the upper bowl is filtered in the passage thereof downwardly through the funnel, said body being provided with an axial recess open at the lower end of the body, a guide stem in the recess extending to the lower end thereof and along which the body is relatively slidable, resilient means attached to the lower end of the stem and adapted to be pressed into the funnel by contact with the body as the latter is placed in filtering position for anchoring the stem in a position coaxial with respect to the funnel, and a helical compression spring on the stem within said recess and being yieldable to enable the body to rise along the stem in guided relation with respect thereto in response to pressure above a given value to enlarge said space to accommodate an increase in the rate of passage of water upwardly through the funnel and acting on the body to restore the same to normal filtering position upon reduction of said pressure to said value for insuring the filtering of the liquid upon flow thereof downwardly through the funnel.

EDWARD J. RUHNKE.
HENRY S. PERLMAN.

REFERENCES CITED

The following references are of record in the file of this patent:

UNITED STATES PATENTS

| Number | Name | Date |
| --- | --- | --- |
| 417,628 | Buob | Dec. 17, 1889 |
| 2,269,956 | Renner | Jan. 13, 1942 |
| 2,331,705 | Lehmann | Oct. 12, 1943 |
| 2,392,656 | Foster | Jan. 8, 1946 |

Certificate of Correction

Patent No. 2,482,940 September 27, 1949

EDWARD J. RUHNKE ET AL.

It is hereby certified that errors appear in the printed specification of the above numbered patent requiring correction as follows:

Column 2, line 34, for the words "or parts" read *of parts*; column 5, line 13, for "contracting" read *contacting*;

and that the said Letters Patent should be read with these corrections therein that the same may conform to the record of the case in the Patent Office.

Signed and sealed this 7th day of February, A. D. 1950.

[SEAL]

THOMAS F. MURPHY,
*Assistant Commissioner of Patents.*